Nov. 24, 1964  B. L. SOMMER  3,158,347
MOTOR BASE
Filed Oct. 10, 1961
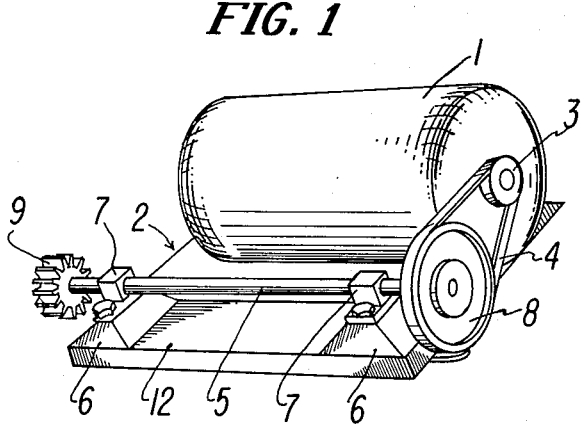
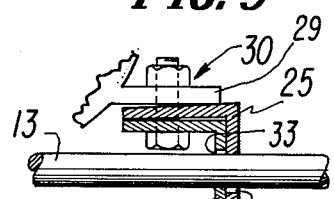
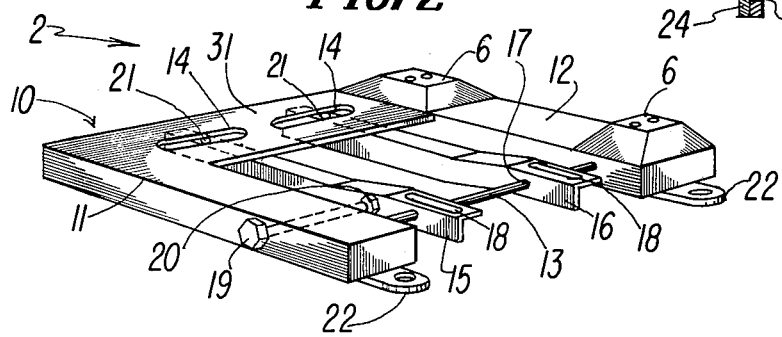
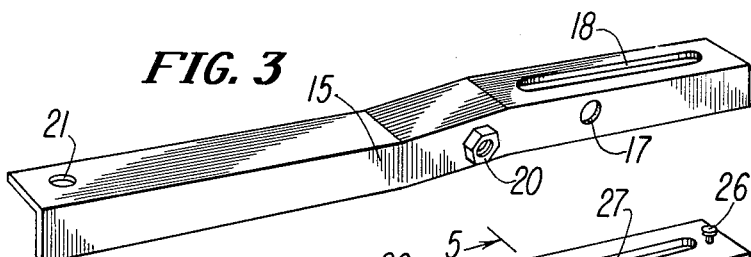
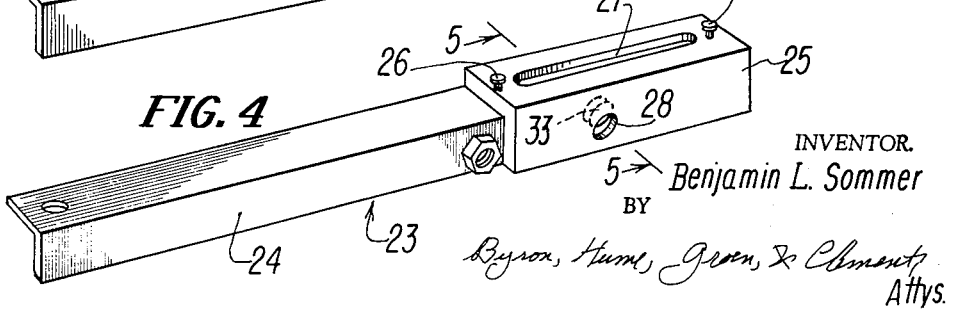
INVENTOR.
Benjamin L. Sommer
BY
Byron, Hume, Groen, & Clements
Attys.

United States Patent Office 3,158,347
Patented Nov. 24, 1964

3,158,347
MOTOR BASE
Benjamin L. Sommer, 5821 N. Briarwood Lane,
Peoria, Ill.
Filed Oct. 10, 1961, Ser. No. 144,161
6 Claims. (Cl. 248—23)

The present invention relates to a motor base for supporting electric or gasoline motors and, more particularly, to a motor base suitable to support motors of varying sizes and to adjust the position of the motor to provide proper V-belt tension.

It is well known that electric motors, even if they have the same power output rating, will vary in size and that the studs or feet thereon for securing the motor to a base will likewise have varying spacing depending upon the size of the motor, the manufacturer and the like. The same is true of gasoline motors. It is therefore desirable to have a motor base upon which different motors may be mounted.

Electric and gasoline motors are commonly employed for driving air compressors, pumps and the like, either directly or indirectly through jack shafts, for example. It is, of course, necessary that the V-belt driven by the motor be sufficiently tight so that it will not slip upon the motor pulley or the pulley that it is driving. Otherwise, some of the power output of the motor would be lost. Thus, it is desirable to have a motor base adapted to adjust the position of the motor so as to properly tighten up the V-belt or driving belt.

It is an object of the present invention to provide a motor base which is capable of supporting motors of various sizes.

It is a further object of the present invention to provide a motor base upon which the position of the supported motor may be adjusted to properly tighten the V-belt drive.

In accordance with these and other objects more apparent hereinafter, the present invention comprises a motor base constructed in such a manner to accommodate motors of various sizes. The present motor base has particular application when the motor drives a jack shaft through a V-belt as the motors are so supported by the present base that proper V-belt adjustment is readily permitted, thereby obtaining most effective utilization of the power output of the motor.

The invention, both as to its organization and method of operation, taken with further objects and advantages thereof, will best be understood by reference to the following description taken in conjunction with the accompanying drawings, in which:

FIG. 1 is a simplified perspective view of a motor base or motor support embodying the features of the present invention, illustrated as used with an electric motor and a jack shaft;

FIG. 2 is a perspective view of the motor base of FIG. 1;

FIG. 3 is a perspective view of a slidably mounted bracket embodied in the motor base of FIG. 1;

FIG. 4 is a perspective view of a modified slidably mounted bracket of FIG. 3 and;

FIG. 5 is a cross-sectional view taken along line 5—5 of FIG. 4 showing the bracket mounted and a motor foot secured thereto.

Referring now to the drawings, and more particularly to FIG. 1, there is illustrated diagrammatically a motor base or motor support 2 embodying the features of the present invention. The motor base 2 is capable of supporting motors of various sizes and of adjusting the position of the supported motor with respect to the motor base. The desirability of the latter feature, in particular, is made evident by an arrangement illustrated in FIG. 1 wherein the motor base 2 is supporting a motor 1 employed to drive a jack shaft 5 by a pulley and V-belt arrangement designed for speed reduction. The jack shaft 5 is supported by a pair of bearings 7 which are mounted upon pillow blocks 6 on the motor base 2. The jack shaft 5 is driven by a V-belt 4 operatively transmitting the power output of the motor 1 to the jack shaft 5 by cooperating with a pulley 3 on the drive shaft of the motor 1 and a pulley 8 on one end of the jack shaft 5. The pulley 3 is substantially smaller than the pulley 8 to effect the desired speed reduction. A pinion gear 9 on the jack shaft 5 is suitably connected to apparatus requiring rotational power for operation, such as a pump, compressor or the like.

It will be apparent from FIG. 1 that proper cooperation between the motor 1 and the jack shaft 5 can be obtained only if the V-belt 4 is sufficiently tight between the pulleys 3 and 8. Any adjustment between these pulleys must be obtained by movement of the motor 1 or jack shaft 5. In the instant motor base 2, as will be seen more clearly hereinafter, means are provided wherein the motor 1 may be moved relative to the jack shaft 5 so that the V-belt 4 may be tightened up prior to operation of the motor 1.

The present motor base 2, which is capable of supporting motors of different sizes and affords means for tightening the V-belt 4 between the motor 1 and jack shaft 5, is illustrated in more detail in FIG. 2. The motor base 2 comprises a generally U-shaped member 10 having a base 31 and legs 11 and 12. A rod 13 is supported by the legs 11 and 12. The leg 12 supports pillow blocks 6 which, as seen in FIG. 1, support bearings 7 for a jack shaft 5 to effect speed reduction or speed increase, depending on the particular apparatus to be driven by the motor. The base 31 of the U-shaped member 10 contains a pair of longitudinal slots 14, each slot being adapted to receive a motor stud or, in the alternative, a bolt which cooperates with a foot or a threaded hole in the base of the motor. A pair of support brackets 15 and 16 are slidably mounted on the rod 13 and are elongate L-shaped members each having a vertically disposed leg with a hole 17 through which the rod 13 extends to support these brackets. Each of the horizontally disposed legs of the brackets 15 and 16 has a longitudinal slot 18 which is adapted to receive a stud from the base of the motor or, alternatively, a bolt which extends upwardly therethrough into cooperation with the feet or threaded holes in the base of the motor. The slots 18 are at about 90° angles to the slots 14 in the base 31 of the U-shaped member 10. The support brackets 15 and 16 extend beneath the base 31 of the U-shaped member 10 and the slots 14 and have holes 21 in their horizontally disposed legs which are in alignment with the slots 14. In this manner a motor stud or a bolt for securing the motor 1 to the motor base 2 will extend through the aligned slot 14 and hole 21 as will be more apparent hereinafter.

To provide for adjustment of the motor 1 upon the motor base 2 so as to effect proper tightening of the V-belt 4, a take-up screw 19 extends through the leg 11 and cooperates with the support bracket 15 so that upon rotation of the take-up screw 19 the support bracket 15 is moved either away from or toward leg 11. A nut 20 is secured by suitable means, for example by welding or the like, to bracket 15 in alignment with a hole in the vertically disposed leg of the bracket 15, as best shown in FIG. 3. The take-up screw 19 threadably engages the nut 20 and may, during adjustment, extend through this hole in the support bracket 15. Take-up screw 19 is preferably substantially parallel to the rod 13 so that during the adjustment stage the bracket 15 will slide smoothly upon the rod 13. Of course, if desired, the nut 20 may be eliminated and threaded engagement between the take-up screw 19 and the support bracket 15 may be provided by a threaded hole in the vertically disposed leg of the bracket 15.

As shown in FIG. 2, suitable flanges 22 having holes therein may be connected to the U-shaped member 10 at appropriate positions for securing the motor base to a concrete pad or the like.

The gasoline or electric motor 1 to be secured to the motor base 2 may have four downwardly extending, threaded studs for securing the motor to the motor base. In such instances the motor 1 is placed on the motor base 2 by putting the two studs at one end of the motor 1 through the slots 14 of the U-shaped member 10 and the holes 21 in the support brackets 15 and 16 and placing the other pair of studs through slots 18 in the brackets 15 and 16.

Since the support brackets 15 and 16 are slidably mounted upon rod 13 and the slots 14 are elongated in the direction which these brackets may move, it is apparent that the motor base 2 may accommodate motors of varying widths. The longitudinal slots 18 in the brackets 15 and 16 permit the motor base 2 to support motors having a variety of lengths, also.

After the motor studs have been placed through the appropriate slots and holes in the motor base 2, nuts are loosely placed on the motor studs. The V-belt 4 is then placed on the motor pulley 3 and the pulley 8, or the like, and the take-up screw 19 is turned in the appropriate direction to move bracket 15 and thereby position the motor 1 so as to properly tighten up the V-belt 4 between the pulleys 3 and 8. Once the V-belt 4 has been tightened up, the nuts which have been placed on the motor studs below the horizontally disposed leg of brackets 15 and 16 are tightened up so that the motor 1 is securely fastened to the motor base 2. The motor 1 is then turned on and operation initiated.

Likewise, if the motor 1, instead of containing motor studs, has threaded holes in a bottom portion thereof for securing it to a motor base 2, bolts may be passed upwardly through the slots 18 and the slots 14 and holes 21 to loosely secure the motor 1 to the motor base 2 in the manner described hereinbefore. Then, as before, the take-up screw 19 is rotated to tighten up the V-belt 4. Once the V-belt 4 has been tightened, the bolts may be further threaded into the holes in the motor to securely fasten the motor 1 to the motor base 2.

If the motor 1 has feet for securing it to a suitable base, it will be understood that the motor 1 may be secured to the present motor base 2 in the same manner discussed hereinbefore, with the exception that a nut and bolt will be required for each foot.

It will be understood that the legs 11 and 12 of the U-shaped member 10 support the motor base and that the base 31 of the U-shaped member 10 is sufficiently above the floor or pad to permit the brackets 15 and 16 to extend beneath it. Furthermore, as shown in FIGS. 2 and 3, it will be understood that brackets 15 and 16 may have an angularly disposed intermediate portion, if necessary, so that one end of the bracket may extend beneath the base member 31 of U-shaped member 10.

Referring now to FIGS. 4 and 5 there is illustrated a modified support bracket 23 which is adapted to be locked in place and thereby prevent chatter when the motor 1 is securely fastened to the motor base 2. The support bracket 23 comprises two L-shaped members 24 and 25. The L-shaped member 24 may be similar to support brackets 15 and 16 discussed hereinbefore, and has a hole 33 in its horizontally disposed leg to receive the rod 13. The member 25 overlies the slotted end of the member 24 and is loosely secured thereto by a pair of rivets 26 or the like. The horizontally disposed leg of L-shaped member 25 contains a slot 27 which is in alignment with the slot in the horizontally disposed leg of L-shaped member 24. The vertically disposed leg of the L-shaped member 25 contains a hole 28 which communicates with the hole 33 in the L-shaped member 24, but is not in direct alignment therewith when the horizontally disposed leg of member 25 rests upon the horizontally disposed leg of member 24, as shown in FIG. 4. In such instances the hole 28 is positioned below the hole 33 in member 24. When the support bracket 23 is placed on rod 13, holes 28 and 33 are aligned and the horizontally disposed leg of L-shaped member 25 is thereby in spaced relationship with the horizontally disposed leg of L-shaped member 24, as shown in FIG. 5. When a motor foot 29 is placed on the support bracket and secured thereto by a nut and bolt 30, the bolt extending through a hole in the foot 29 and the slots in members 24 and 25, the member 24 will be lifted upwardly such that the bottom of the hole 33 will securely engage the rod 13, while the top of hole 28 of member 25 will be resting upon the rod 13. In this manner the modified bracket 23 is locked in place and vertical movement of the bracket due to motor vibration is prevented. In all other respects the bracket 23 operates similar to brackets 15 and 16.

Furthermore, it will be understood that the pillow blocks are merely a preferred embodiment of the instant invention and that they are not requisite to the motor base 2 to achieve its advantages. If, for example, the motor is to directly drive a pump, compressor, or the like by means of a V-belt or the like, then the pillow blocks would not be required. The pillow blocks are on the present motor base merely as a preferred embodiment wherein it is desirable to provide speed reduction or speed increase for the particular motor being employed.

While the embodiments described herein are at present considered to be preferred, it is understood that various modifications and improvements may be made therein, and it is intended to cover in the appended claims all such modifications and improvements as fall within the true spirit and scope of the invention.

What is desired to be secured by Letters Patent of the United States is:

1. A motor support comprising a substantially U-shaped member having a base and two legs, said base having two slots therein, a pair of brackets each having one end movably supported upon a support member and another end freely extending beneath said base, said support member being supported by said legs of said U-shaped member, said brackets having longitudinal slots which are respectively at about 90° angles to the slots in the base of said U-shaped member, and means associated with each of said brackets to lock said brackets in position when a motor is rigidly secured to said brackets.

2. A motor support comprising a substantially U-shaped member, said U-shaped member having a base and two legs, said base having two longitudinal slots therein, said legs supporting a rod, a pair of substantially L-shaped brackets movably mounted upon said rod, one end of each bracket extending beneath the base of said U-shaped member, said brackets having a substantially vertically disposed surface and a substantially horizontally disposed surface, said vertically disposed surface having a hole therein through which said rod extends, said horizontally disposed surface having a longitudinal slot therein which is at about a 90° angle to the slots in the base of said U-shaped member, said brackets having a hole in their horizontally disposed surface which is in alignment with the slots in said base of said U-shaped member, and means to lock said brackets in position when a motor is secured thereto.

3. The motor support of claim 2 wherein one of said L-shaped brackets is adapted to threadably engage an adjustment means which extends through and is supported by a leg of said U-shaped member.

4. A motor support comprising a substantially U-shaped member, said U-shaped member having a base and two legs, said base having two longitudinal slots therein, said legs supporting a rod, a pair of substantially L-shaped brackets movably mounted upon said rod, one end of each bracket extending beneath the base portion of said U-shaped member, said brackets having a substantially vertically disposed surface and a substantially horizontally disposed surface, said vertically disposed surface having a hole therein through which said rod extends, said horizontally disposed surface having a longitudinal slot therein which is at about a 90° angle to the slots in the base of said U-shaped member, said brackets having a hole in their horizontally disposed surface which is in alignment with the slots in said base of said U-shaped member, said brackets each having an L-shaped member loosely secured thereto, said L-shaped member having a horizontally disposed leg with a longitudinal slot therein and a vertically disposed leg having a hole therein through which said rod extends, the hole in said L-shaped member being in spaced relation from the hole in said bracket when the horizontally disposed leg of said L-shaped member is resting upon the horizontally disposed surface of said bracket.

5. A motor support comprising a substantially U-shaped member having a base and two legs, said base having slots therein, a pair of brackets movably supported upon a support member, said support member being supported by said legs of said U-shaped member, said brackets having longitudinal slots which are respectively at 90° angles to the slots in the base of said U-shaped member, said brackets being L-shaped members, said L-shaped members having a substantially vertically disposed leg and a substantially horizontally disposed leg, said vertically disposed leg having a hole therein through which said support member extends, said horizontally disposed leg having said horizontal slot therein, a second L-shaped member loosely secured to each of said brackets, said second L-shaped member having a second horizontally disposed leg and a second vertically disposed leg, said second vertically disposed leg having a hole therein through which said support member extends, the hole in said second L-shaped member being in spaced relation with respect to the hole in said bracket when the horizontally disposed leg of said second L-shaped member is resting upon said horizontally disposed leg of said bracket whereby said bracket is locked in place on said support member.

6. The motor support of claim 2 wherein said second L-shaped member is secured to said bracket by rivet means and said hole in said leg of said second L-shaped member is non-coaxial with said hole in said vertically disposed leg of said bracket when said motor is fixedly secured to said bracket and said second L-shaped member whereby said bracket is locked to said support member.

References Cited in the file of this patent

UNITED STATES PATENTS

| | | |
|---|---|---|
| 1,786,192 | Cullman | Dec. 23, 1930 |
| 1,974,158 | Okenfuss | Sept. 18, 1934 |
| 1,984,664 | Teves | Dec. 18, 1934 |

FOREIGN PATENTS

| | | |
|---|---|---|
| 65,552 | Denmark | Aug. 11, 1947 |